(12) United States Patent
Soeda (10) Patent No.: US 7,243,565 B2
(45) Date of Patent: Jul. 17, 2007

(54) TWIN-CLUTCH MANUAL TRANSMISSION

(75) Inventor: Kazuhiko Soeda, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 174 days.

(21) Appl. No.: 11/074,751

(22) Filed: Mar. 9, 2005

(65) Prior Publication Data

US 2005/0204840 A1    Sep. 22, 2005

(30) Foreign Application Priority Data

Mar. 22, 2004   (JP)   ............................. 2004-082310

(51) Int. Cl.
*F16H 3/08*   (2006.01)
(52) U.S. Cl. .......................................... 74/329; 74/330
(58) Field of Classification Search ................ 74/329, 74/333, 331, 340, 330
See application file for complete search history.

(56) References Cited

U.S. PATENT DOCUMENTS

| | | | | |
|---|---|---|---|---|
| 2,174,259 A | * | 9/1939 | Feerick et al. | 74/330 |
| 2,396,456 A | * | 3/1946 | Campodonico | 74/330 |
| 5,613,401 A | * | 3/1997 | Maurizio | 74/325 |
| 6,044,719 A | * | 4/2000 | Reed et al. | 74/330 |
| 6,286,381 B1 | * | 9/2001 | Reed et al. | 74/336 R |
| 6,883,394 B2 | * | 4/2005 | Koenig et al. | 74/335 |
| 7,082,850 B2 | * | 8/2006 | Hughes | 74/329 |
| 2005/0103140 A1 | * | 5/2005 | Gumpoltsberger | 74/329 |

FOREIGN PATENT DOCUMENTS

| | | |
|---|---|---|
| DE | 37 21 214 A1 | 1/1989 |
| EP | 1 004 795 A1 | 5/2000 |
| EP | 1 467 128 A1 | 10/2004 |
| JP | 61-274144 A | 12/1986 |
| JP | 61274144 A * | 12/1986 |
| JP | 8-320054 A | 12/1996 |
| JP | 2000-234654 A | 8/2000 |

OTHER PUBLICATIONS

U.S. Appl. No. 11/074,750, filed Mar. 9, 2005, Soeda.

* cited by examiner

*Primary Examiner*—Charles A. Marmor
*Assistant Examiner*—Justin K. Holmes
(74) *Attorney, Agent, or Firm*—Foley & Lardner LLP (57) ABSTRACT

A twin-clutch manual transmission including: first and second input shafts provided with respective clutches; a counter shaft parallel to these input shafts; gear sets of an odd-numbered gear range group disposed between the rear end portion of the first input shaft and the counter shaft; gear sets of the even-numbered gear range group disposed between the second input shaft and the counter shaft; an output shaft being concentric with and abutting on a rear end of the first input shaft; and a synchronizer provided between the rear end of the first input shaft and the output shaft to provide a direct-coupling gear range. The odd-numbered gear range group includes the direct-coupling gear range.

8 Claims, 2 Drawing Sheets

TWIN-CLUTCH MANUAL TRANSMISSION

BACKGROUND OF THE INVENTION

1. Field of the Invention

The present invention relates to a twin-clutch manual transmission which includes two clutches respectively connected by shafts to two groups of transmission gear sets, in which smooth gearshifts are achieved by alternately disengaging one of the clutches while engaging the other to change the gear set engaged.

2. Description of Related Art

Japanese Patent Application Laid-open Publication no. 8-320054 discloses a twin-clutch manual transmission for a front engine and front wheel drive vehicle (FF-vehicle), which includes first and second input shafts adapted to be selectively and drivably connected for receiving an engine power output through respective clutches. The second input shaft is hollow and rotatably supported on the first input shaft. The first input shaft protrudes outward from a rear end of the second input shaft at a position remote from the engine. Gear sets of even-numbered gear range group is disposed between a rear end protruding portion of the first input shaft and the counter shaft which is placed in parallel to the first and second input shafts, for suitably providing selective power transfer. Further, gear sets of odd-numbered gear range group are disposed between the second input shaft and the counter shaft for suitably providing selective power transfer, whereby the engine power output resulting from gearshift depending on a selected gear range can be extracted from a front end of the counter shaft in a radial direction at a position closer to the engine.

With such a twin-clutch manual transmission, even when one gear range of one of the groups is selected with the associated clutch being engaged, next gear range of the other group can be pre-selected with the associated clutch therewith being disengaged. A gearshift can be realized by disengaging the clutch associated with the one gear range, while engaging the clutch associated with the next gear range of the other group, that is, upon a so-called clutch changeover control. By alternately selecting an intended gear range between the gear range groups, it is possible to perform an automatic power transmission even with a manual transmission.

SUMMARY OF THE INVENTION

With the twin-clutch manual transmission as described above, the rotational power, resulting from gearshift, is extracted from the front end of the counter shaft in the area closer to the engine in the radial direction. Such a configuration can be used for the twin-clutch manual transmission for the FF-vehicle.

However, it is hard to apply such a configuration for a front engine and rear wheel drive vehicle (FR vehicle), in which the rotational power resulting from the gearshift is required to be extracted from a rear end of a twin-clutch manual transmission in an axial direction and delivered to the counter shaft.

The present invention is made based on a fact that in case of using the twin-clutch manual transmission for the FR-vehicle, there is a need for the rotational power, resulting from the gearshift depending on a selected gear range, to be extracted in an axial direction from a rear end of the transmission, and an output shaft of the transmission is therefore placed to be in a concentric and abutting relationship with the rear end of the first input shaft.

It is an object of the present invention to provide a direct-coupling gear range in such an abutment section, to thereby decrease the number of gear ratios in the twin-clutch manual transmission for the FR-vehicle, realizing a closed gear ratio configuration.

An aspect of the present invention is a twin-clutch manual transmission comprising: first and second input shafts adapted to selectively receive an engine rotational power through respective clutches, the second input shaft being hollow and rotatably supported on the first input shaft such that the first input shaft protrudes from a rear end of the second input shaft to a position remote from an engine to form a rear end portion; a counter shaft extending parallel to the first and second input shafts; gear sets of one of an odd-numbered gear range group and an even-numbered gear range group disposed between the rear end portion of the first input shaft and the counter shaft to provide power transfer; gear sets of the other of the odd-numbered gear range group and the even-numbered gear range group disposed between the second input shaft and the counter shaft to provide power transfer; an output shaft placed in a concentric and abutting relationship with a rear end of the first input shaft to allow a rotational power, resulting from speed reduction depending on a selected gear range, to be extracted from the output shaft through the counter shaft; and a meshing mechanism disposed on an abutting section between the rear end of the first input shaft and the output shaft to provide a direct-coupling gear range; wherein the gear range group disposed between the rear end portion of the first input shaft and the counter shaft includes the same gear range group as the odd-numbered gear range group or the even-numbered gear range group to which the direct-coupling gear range belongs.

BRIEF DESCRIPTION OF THE DRAWINGS

The invention will now be described with reference to the accompanying drawings wherein.

DETAILED DESCRIPTION OF THE PREFERRED EMBODIMENT

An embodiment of the present invention will be explained below with reference to the drawings.

The twin-clutch manual transmission of the embodiment is applied to a front engine and rear wheel drive vehicle (FR vehicle).

Figure 1:
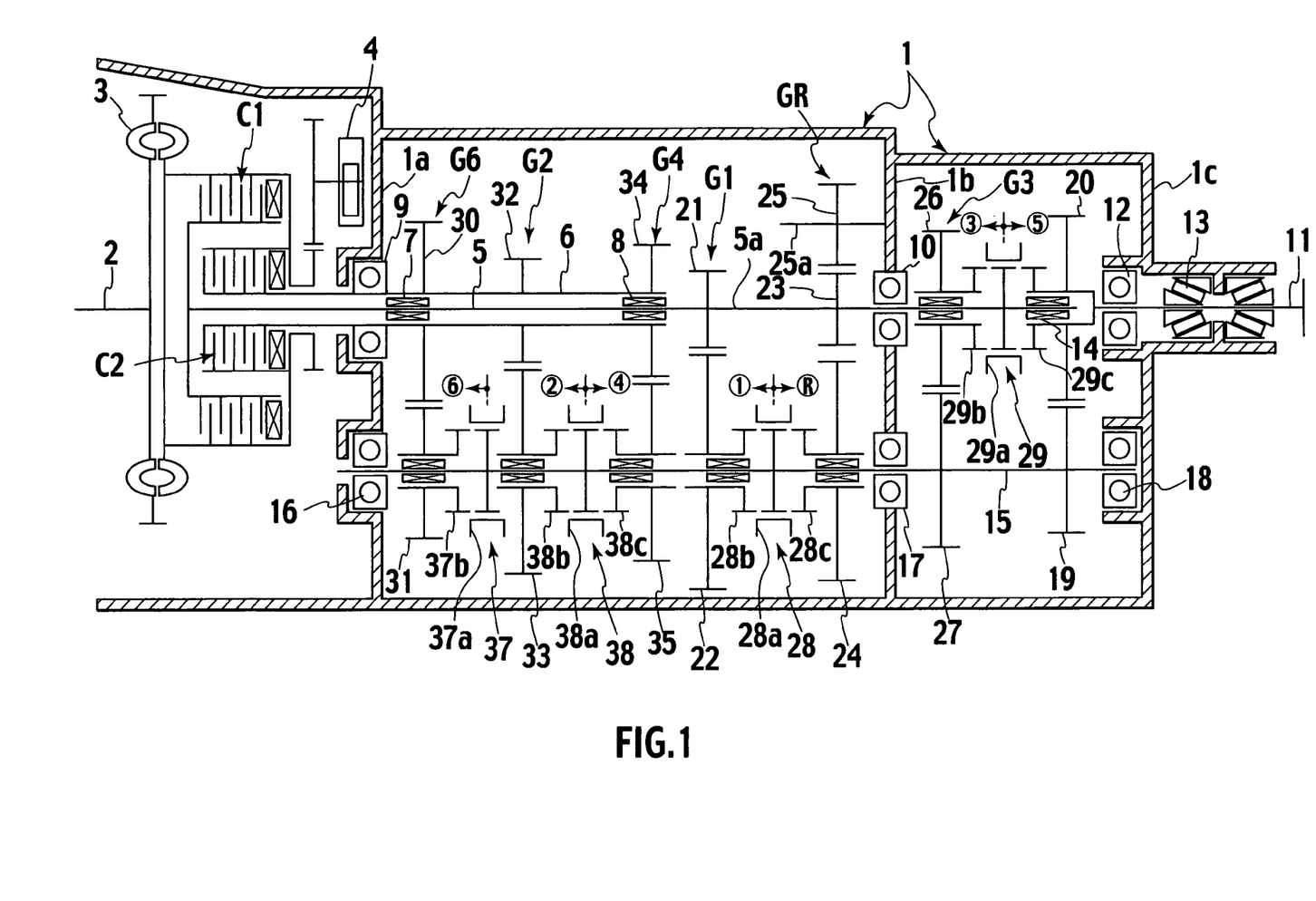
FIG. 1 is a diagram of a twin-clutch manual transmission according to an embodiment of the present invention.

As shown in FIG. 1, the twin-clutch manual transmission is comprised of a transmission case 1 and a gearshift mechanism accommodated in the transmission casing 1, which is described below in detail.

The gearshift mechanism includes an automatic clutch C1 disposed to be closer to an engine with crankshaft 2, which cooperates with odd-numbered gear range group for "First-speed range", "Third-speed range", "Fifth-speed range" and "Reverse drive", and an automatic clutch C2 disposed to be closer to the engine, which cooperates with even-numbered gear range group for "Second-speed range", "Fourth-speed range" and "Sixth-speed range". Both the clutches C1, C2 are connected to the engine crankshaft 2 under a buffered condition by means of a torsional dumper 3.

Also disposed inside a front portion of the transmission case 1 is an oil pump 4 which is driven by the engine through the torsional dumper 3 at all times. The oil pump 4 provides hydraulic oil as medium to control selection of gear range involving engagement of the clutches C1, C2.

Figure 2:
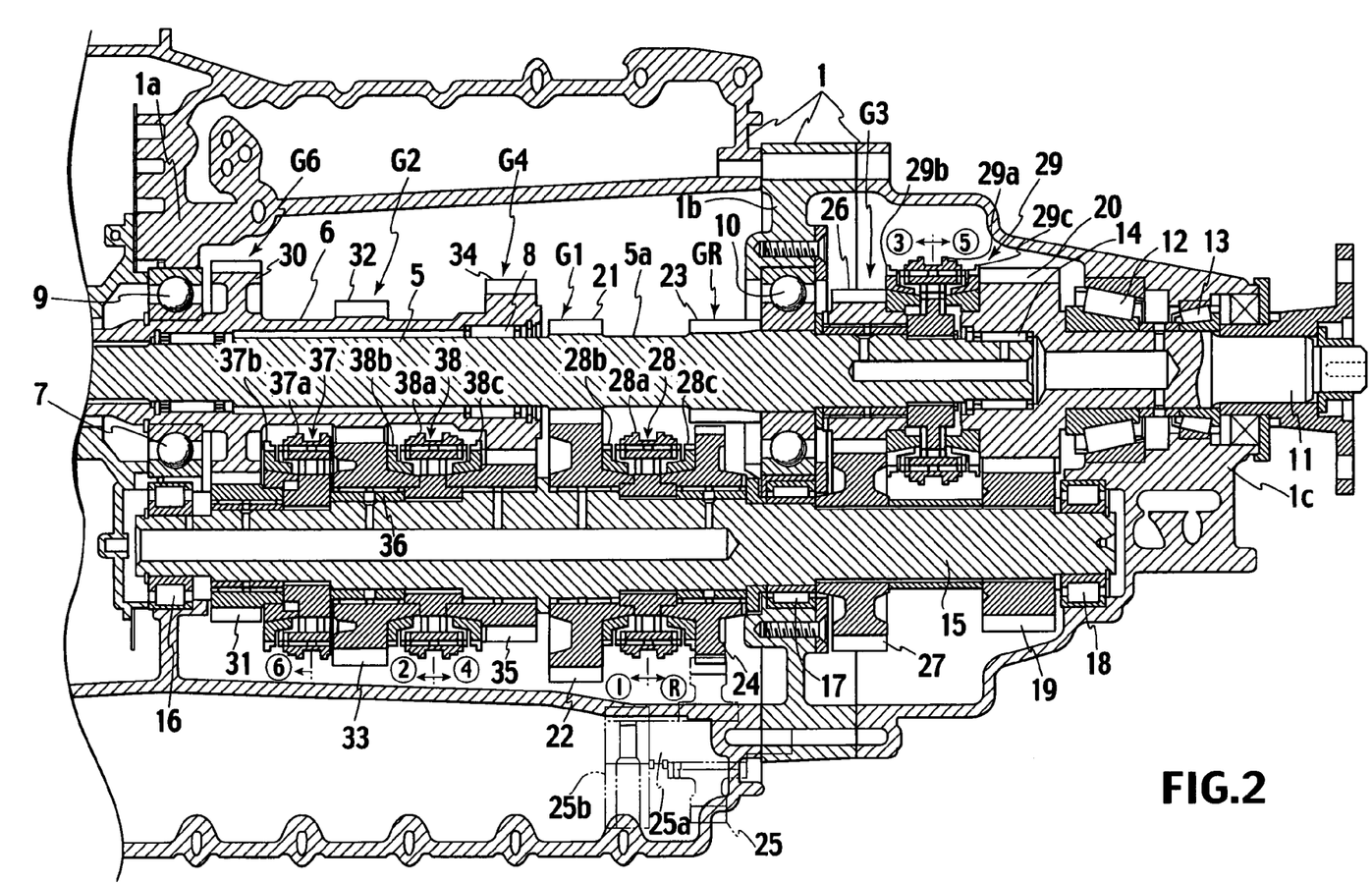
FIG. 2 is a cross-sectional view of the twin-clutch manual transmission according to the embodiment of the present invention.

The gearshift mechanism in the transmission case 1 is comprised of, as shown in FIGS. 1 and 2, a first input shaft 5 and a second input shaft 6 to which an engine power output is selectively delivered through the torsional dumper 3 by means of the odd-numbered gear range clutch C1 and the even-numbered gear range clutch C2. The second input shaft 6 is a hollow shaft through which the first input shaft 5 axially extends. Defined between the first and second input shafts 5, 6 is an annular or tubular space in which front and rear needle bearings 7, 8 are incorporated in an axially spaced relationship. These bearings 7 and 8 rotatably support the first input shaft 5 inside the second input shafts 6 in a concentric relation.

The first and second input shafts 5, 6 have respective forward ends located closer to the engine, both of which extend forward from a front wall 1a of the transmission case 1 and are connected to the associated clutches C1, C2, respectively.

The second input shaft 6 has a front end whose outer periphery is rotatably supported by the front wall 1a of the transmission case 1 by means of a ball bearing 9. The front needle bearing 7 is mounted in the annular space in the vicinity of the ball bearing 9, while the rear needle bearing 8 is mounted in a rear end of the second input shaft 6 at a position remote from the engine.

The first input shaft 5 has a rear end portion 5a protruding rearward from the rear end of the second input shaft 6, which penetrates through an intermediate wall 1b of the transmission case 1 at which a ball bearing 10 is mounted for rotatably supporting the rear end portion 5a on the intermediate wall 1b of the transmission case 1.

Concentrically disposed in abutting relationship with the rear end portion 5a of the first input shaft 5 is an output shaft 11 that is rotatably supported on a rear wall 1c of the transmission case 1 by means of a ball bearing 12 and a tapered roller bearing 13. The output shaft 11 is rotatably carried by the rear end portion 5a of the input shaft 5 by means of a needle bearing 14.

Disposed in parallel to the first and second input shafts 5, 6 and the output shaft 11 is a counter shaft 15 that is rotatably supported on the front wall 1a, the intermediate wall 1b and the rear wall 1c of the transmission case 1 by means of roller bearings 16, 17, 18.

Integrally mounted on a rear end of the counter shaft 15 to be rotatable therewith is a counter gear 19 that is placed on the same plane perpendicular to the output shaft 11 as an output gear 20 which meshes with the counter gear 19 to allow the counter shaft 15 to be drivably connected to the output shaft 11.

Here, the counter gear 19 is made smaller in a pitch circle diameter than the output gear 20, with the counter gear 19 and the output gear 20 constituting a reduction gear set.

Disposed between the rear end portion 5a of the first input shaft 5 and the counter shaft 15 are gear sets G1, G3 of the odd-numbered gear range group for "First-speed range" and "Third-speed range" and a gear set GR of the "Reverse drive" gear range, which are assembled in a structure to allow a "First-speed range" gear set G1, a "Reverse drive" gear set GR and a "Third-speed range" gear set G3 to be placed in this order from a front area closer to the engine to a rear area.

The "First-speed range" gear set G1 and the "Reverse drive" gear set GR are disposed between the rear end of the second input shaft 6 and the intermediate wall 1b of the transmission case 1, and the "Reverse drive" gear set GR is placed immediately closer to the intermediate wall 1b of the transmission case 1 whereas the "Third-speed range" gear set G3 is located in a position opposite to the intermediate wall 1b of the transmission case 1 at a position immediately closer thereto, that is, in a position remotest from the first input shaft 5.

The "First-speed range" gear set G1 is comprised of a "First-speed range" input gear 21 integrally formed with the rear end portion 5a of the first input shaft 5, and a "First-speed range" output gear 22 freely rotatable on the counter shaft 15 and meshing with the "First-speed range" input gear 21.

The "Reverse drive" gear set GR is comprised of a "Reverse drive" input gear 23 integrally formed with the rear end portion 5a of the first input shaft 5, a "Reverse drive" output gear 24 rotatably disposed on the counter shaft 15, and a "Reverse Idler" gear 25 meshing with the gears 23, 24 to reverse the rotation direction of the "Reverse Drive" input gear 23 and make the rotation direction of the "Reverse drive" output gear 24 opposite to that of the other output gears. The "Reverse Idler" gear 25 is rotatably supported on a "Reverse" idler shaft 25a fixedly secured to the intermediate wall 1b of the transmission case 1.

Also, a distal end of the idler shaft 25a, remotest from the intermediate wall 1b of the transmission case 1, is located at a position between the gears 22, 24 and supported by a flange 25b fixedly secured to the transmission case 1.

The "Third-speed range" gear set G3 is comprised of a "Third-speed range" input gear 26 freely rotatable on the rear end portion 5a of the first input shaft 5, and a "Third-speed range" output gear 27 drivably connected to the counter shaft 15 and meshing with the "Third-speed range" input gear 26.

Disposed on the counter shaft 15 between the "First-speed range" output gear 22 and the "Reverse Drive" output gear 24 is a "First-speed range-Reverse Drive" synchronizer (meshing mechanism) 28 that includes an axially movable synchronizer sleeve 28a. The synchronizer sleeve 28a normally assumes a neutral position, as shown in FIG. 1. The synchronizer sleeve 28a is movable leftward in FIG. 1 from the neutral position to mesh with a clutch gear 28b, to thereby allow the "First-speed range" output gear 22 to be drivably connected to the counter shaft 15 to enable the selection of the "First-speed range", as described below. The synchronizer sleeve 28a is also movable rightward from the neutral position to mesh with a clutch gear 28c to allow the "Reverse Drive" output gear 24 to be drivably connected to the counter shaft 15 to enable the selection of the "Reverse Drive", as described below.

Disposed on the rear end portion 5a of the first input shaft 5 at a position between the "Third-speed range" input gear 26 and the output gear 20 is a "Third-speed range-Fifth-speed range" synchronizer 29 that includes an axially movable synchronizer sleeve 29a. The synchronizer sleeve 29a normally assumes a neutral position, as shown in FIG. 1. The synchronizer sleeve 29a is movable leftward in FIG. 1 from the neutral position to mesh with a clutch gear 29b to allow the "Third-speed range" input gear 26 to be drivably connected to the first input shaft 5 to enable the selection of the "Third-speed range", as described below, and also movable rightward in FIG. 1 from the neutral position to mesh with a clutch gear 29c to allow the output gear 20 (output shaft 11) to be directly connected to the first input shaft 5 to enable the selection of the "Fifth-speed range", as described below.

The "Third-speed range" gear set G3 is located in the rearmost area of the first input shaft 5 in a manner as described above, because among the gear sets of the odd-numbered gear range group, a synchronization meshing capacity (or capacity of a synchronizer) between an input gear 26 of the "Third-speed range" gear set G3 and the first input shaft 5 is closest to a synchronization meshing capacity for direct coupling between the first input shaft 5 and the output shaft 11. This enables the synchronizer 29 to serve both for the "Third-speed range" and the "Fifth-speed range", contributing to simplifying structure and saving cost.

Disposed between the hollow second input shaft 6 and the counter shaft 15 are gear sets of the even-numbered gear range group for "Second-speed range", "Fourth-speed range" and "Sixth-speed range". These gear sets include a "Sixth-speed range" gear set G6, a "Second-speed range" gear set G2 and a "Fourth-speed range" gear set G4, which are provided in this order in an area from the front side closer to the engine to the rear end of the second input shaft 6.

The "Sixth-speed range" gear set G6 is mounted to a front end of the second input shaft 6 at a position near the front wall 1a of the transmission case 1, and the "Fourth-speed range" gear set G4 is mounted on a rear end of the second input shaft 6 while the "Second-speed range" gear set G2 is mounted to the second input shaft 6 at a central area thereof.

The "Sixth-speed range" gear set G6 is comprised of a "Sixth-speed range" input gear 30 integrally formed with an outer periphery of the second input shaft 6, and a "Sixth-speed range" output gear 31 freely rotatable on the counter shaft 15 and meshing with the "Sixth-speed range" input gear 30.

The "Second-speed range" gear set G2 is comprised of a "Second-speed range" input gear 32 integrally formed with the outer periphery of the second input shaft 6 and a "Second-speed range" output gear 33 freely rotatable on the counter shaft 15 and meshing with the "Second-speed range" input gear 32.

The "Fourth-speed range" gear set G4 is comprised of a "Fourth-speed range" input gear 34 integrally formed on the outer periphery of the second input shaft 6 at a rear end thereof, and a "Fourth-speed range" output gear 35 freely rotatable on the counter shaft 15 and meshing with the "Fourth-speed range" input gear 34.

Now, description is made of a reason why the gear sets G2, G4, G6 of the even-numbered gear range group for "Second-speed range", "Fourth-speed range" and "Sixth-speed range" are disposed in such a way described above between the second input shaft 6 and the counter shaft 15, that is, a reason why the "Sixth-speed range" gear set G6, the "Second-speed range" gear set G2 and the "Fourth-speed range" gear set G4 are provided in this order in the area from the front side closer to the engine to the rear end of the second input shaft 6.

When assembling the gear sets G2, G4, G6 of the even-numbered gear range group for "Second-speed range", "Fourth-speed range" and "Sixth-speed range", there are various requirements involving: a first requirement wherein, of the needle bearings 7, 8 to be disposed between the first and second input shafts 5, 6, the rear needle bearing 8 should be preferably positioned within the second input shaft 6 at a position close proximity to the rear end thereof in relation to a bearing span; and a second requirement wherein, in terms of strength of the counter shaft 15 and an ease of assembling the associated components, a middle portion of the counter shaft 15 at a boundary area between the even-numbered gear range group for "Second-speed range", "Fourth-speed range" and "Sixth-speed range" and the odd-numbered gear range group for "First-speed range", "Third-speed range" and "Reverse Drive" preferably has the maximum diameter and the counter shaft preferably has a shape with a diameter that progressively decreases toward the front end of the counter shaft 15.

To satisfy such requirements, first, among the input gears 30, 32, 34 to be formed on the second input shaft 6, the gear ranges for "Sixth-speed range" and "Fourth-speed range", related to the input gears 30, 34 that are available to provide bearing accommodating spaces for the needle bearing 8 in an area between the first input shaft 5 and the second input shaft 6, are selected and, of these selected gear ranges, the gear set G4 of the lowest-speed gear ratio of "Fourth-speed range" is placed in a position remotest from the engine.

Then, of the other gear ranges for "Sixth-speed range" and "Second-speed range", the gear set G6 of the highest-speed gear ratio of "Sixth-speed range" is placed in a position closest to the engine.

Finally, the gear set G2 of the remaining gear range for "Second-speed range" is disposed between both the gear sets G4, G6.

While in the embodiment, since the even-numbered gear ranges include three units of the "Second-speed range", the "Fourth-speed range" and the "Sixth-speed range" and the remaining gear range to be disposed between the gear sets on both sides includes only one unit of the "Second-speed range", no trouble arises in a placement order for the remaining gear range, it is needless to say that under circumstances where the remaining gear range to be disposed between the gear sets on the both sides includes a plurality of units, these units are disposed such that, in view of the requirement for the counter shaft 15 to be narrowed toward the front end thereof from the middle portion, as the gear set belongs to a high speed gear range, such a gear set should be placed closer to the engine.

In the embodiment, there is a tendency wherein the gear 33 carried on the counter shaft 15 forming the "Second-speed range" gear set G2, has a larger diameter than that of the gear 35 carried on the counter shaft 15 forming the "Fourth-speed range" gear set G4, while an outer diameter of the counter shaft 15 at which the gear 33 is fixedly secured, has a smaller diameter than that of an area at which the gear 35 is placed. Such a tendency can be easily addressed by taking measures of intervening an annular spacer 36 (FIG. 2) between the gear 33 and the counter shaft 15. Thus, no probability occurs for the above-described particular placement of the gear sets to have a difficulty in satisfying the above-described requirement for the counter shaft 15 to be narrowed from the middle portion toward the front end.

Also disposed on the counter shaft 15 between a "Sixth-speed range" output gear 31 and the "Second-speed range" output gear 33 is a "Sixth-speed range Only" synchronizer 37 that includes a synchronizer sleeve 37a.

The synchronizer sleeve 37a normally assumes a neutral position, as shown in FIG. 1. The synchronizer sleeve 37a is movable leftward in FIG. 1 from the neutral position to mesh with a clutch gear 37b to allow the "Sixth-speed range" output gear 31 to be drivably connected to the counter shaft 15 to enable the selection of the "Sixth-speed range", as described below.

Further, disposed on the counter shaft 15 between a "Second-speed range" output gear 33 and the "Fourth-speed range" output gear 35 is a "Second-speed range-Fourth-speed range" synchronizer 38 that includes a synchronizer sleeve 38a. The synchronizer sleeve 38a normally assumes a neutral position, as shown in FIG. 1.

The synchronizer sleeve 38a is movable leftward in FIG. 1 from the neutral position to mesh with a clutch gear 38b to allow the "Second-speed range" output gear 33 to be drivably connected to the counter shaft 15 to enable the selection of the "Second-speed range", as described below.

The synchronizer sleeve 38a is movable rightward in FIG. 1 from the neutral position to mesh with a clutch gear 38c to allow the "Fourth-speed range" output gear 35 to be drivably connected to the counter shaft 15 to enable the selection of the "Fourth-speed range", as described below.

Now, the operation of the twin-clutch manual transmission of the embodiment set forth above will be described below.

In a neutral (N) range and a parking (P) range where no power delivery is required, both the clutches C1, C2 remain engaged while all of the synchronizer sleeves 28a, 29a, 37a, 38a of the synchronizers 28, 29, 37, 38, respectively, remain in the respective neutral positions to render the twin-clutch manual transmission inoperative.

In a "D" range, in which a forward drive power delivery is desired, and in an "R" range where a reverse drive power delivery is desired, the synchronizer sleeves 28a, 29a, 37a, 38a of the synchronizers 28, 29, 37, 38, respectively, are controllably actuated using hydraulic oil delivered from the oil pump 4, in a manner set forth below for thereby enabling the respective forward-drive gear ranges and reverse-drive gear range to be selected.

If the "First-speed range" is desired in the "D" range, the clutch C1, remaining in the engaged status, is disengaged and the synchronizer sleeve 28a of the synchronizer 28 is moved leftward in FIG. 1 to cause the gear 22 to be drivably connected to the counter shaft 15, whereupon the clutch C1 is engaged.

This allows the engine power output to be transferred from the clutch C1 to the output shaft 11 in an axial direction via the first input shaft 5, the "First-speed range" gear set G1, the counter shaft 15 and the output gear sets 19, 20, thereby enabling the power transfer to be achieved at the "First-speed range".

Also, if the "First-speed range" is selected for a startup of running, of course, it follows that the engagement and motion control of the clutch C1 is performed to meet such a startup mode.

During shifting-up from the "First-speed range" to the "Second-speed range", the clutch C2, remaining in the engaged status, is disengaged and the synchronizer sleeve 38a of the synchronizer 38 is moved leftward in FIG. 1 to cause the gear 33 to be drivably connected to the counter shaft 15 and, thereafter, the clutch C1 is disengaged while engaging the clutch C2 for thereby achieving the shifting-up from the "First-speed range" to the "Second-speed range".

Upon completion of such shifting-up operation, the synchronizer sleeve 28a of the synchronizer 28 is restored to its neutral position and the gear 22 is caused to disconnect from the counter shaft 15 whereupon the clutch C1 is engaged.

This allows the engine power output to be transferred from the clutch C2 to the output shaft 11 in the axial direction via the second input shaft 6, the "Second-speed range" gear set G2, the counter shaft 15 and the output gear sets 19, 20, thereby enabling the power transfer to be achieved at the "Second-speed range".

During shifting-up from the "Second-speed range" to the "Third-speed range", the clutch C1, remaining in the engaged status, is disengaged and the synchronizer sleeve 29a of the synchronizer 29 is moved leftward in FIG. 1 to cause the gear 26 to be drivably connected to the first input shaft 5 and, thereafter, the clutch C2 is disengaged while engaging the clutch C1 for thereby shifting up from the "Second-speed range" to the "Third-speed range".

Upon completion of such shifting-up operation, the synchronizer sleeve 38a of the synchronizer 38 is restored to its neutral position and the gear 33 is caused to disconnect from the counter shaft 15 whereupon the clutch C2 is engaged.

This allows the engine power output to be transferred from the clutch C1 to the output shaft 11 in the axial direction via the first input shaft 5, the "Third-speed range" gear set G3, the counter shaft 15 and the output gear sets 19, 20, thereby enabling the power transfer to be achieved at the "Third-speed range".

During shifting-up from the "Third-speed range" to the "Fourth-speed range", the clutch C2, remaining in the engaged status, is disengaged and the synchronizer sleeve 38a of the synchronizer 38 is moved rightward in FIG. 1 to cause the gear 35 to be drivably connected to the counter shaft 15 and, thereafter, the clutch C1 is disengaged while engaging the clutch C2 for thereby shifting up from the "Third-speed range" to the "Fourth-speed range".

Upon completion of such shifting-up operation, the synchronizer sleeve 29a of the synchronizer 29 is restored to its neutral position and the gear 26 is caused to disconnect from the first input shaft 5 whereupon the clutch C1 is engaged.

This allows the engine power output to be transferred from the clutch C1 to the output shaft 11 in the axial direction via the second input shaft 6, the "Fourth-speed range" gear set G4, the counter shaft 15 and the output gear sets 19, 20, thereby enabling the power transfer to be achieved at the "Fourth-speed range".

During shifting-up from the "Fourth-speed range" to the "Fifth-speed range", the clutch C1, remaining in the engaged status, is disengaged and the synchronizer sleeve 29a of the synchronizer 29 is moved rightward in FIG. 1 to cause the first input shaft 5 to be drivably connected to the output shaft 11 and, thereafter, the clutch C2 is disengaged while engaging the clutch C1 for thereby shifting up from the "Fourth-speed range" to the "Fifth-speed range".

Upon completion of such shifting-up operation, the synchronizer sleeve 38a of the synchronizer 38 is restored to its neutral position and the gear 35 is caused to disconnect from the counter shaft 15 whereupon the clutch C2 is engaged.

This allows the engine power output to be transferred from the clutch C1 to the output shaft 11 in the axial direction via the first input shaft 5 and the synchronizer sleeve 29a, thereby enabling the power transfer to be achieved at the "Fifth-speed range" with a speed reduction ratio of 1:1.

During shifting-up from the "Fifth-speed range" to the "Sixth-speed range", the clutch C2, remaining in the engaged status, is disengaged and the synchronizer sleeve 37a of the synchronizer 37 is moved leftward in FIG. 1 to cause the gear 31 to be drivably connected to the counter shaft 15 and, thereafter, the clutch C1 is disengaged while engaging the clutch C2 for thereby shifting up from the "Fifth-speed range" to the "Sixth-speed range".

Upon completion of such shifting-up operation, the synchronizer sleeve 29a of the synchronizer 29 is restored to its neutral position to release direct connection between the first input shaft 5 and the output shaft 11 whereupon the clutch C1 is engaged.

This allows the engine power output to be transferred from the clutch C2 to the output shaft 11 in the axial direction via the second input shaft 6, the "Sixth-speed range" gear G6, the counter shaft 15 and the output gear sets 19, 20, thereby enabling the power transfer to be achieved at the "Sixth-speed range".

Also, when sequentially shifting down from the "Sixth-speed range" to the "First-speed range", the shifting-down operations are executed in a manner opposite to those in which the shifting-up operations are conducted to achieve a given shift-down.

In the "R" range where the power delivery in the reverse drive is desired, the clutch C1, which has remained in the engaged condition in the "N" range, is disengaged and the synchronizer sleeve 28a of the synchronizer 28 is moved rightward in FIG. 1 to cause the gear 24 to be drivably connected to the counter shaft 15, whereupon the clutch C1 is engaged.

This allows the engine power output to be transferred from the clutch C1 to the output shaft 11 in the axial direction via the first input shaft 5, the "Reverse drive" gear GR, the counter shaft 15 and the output gear sets 19, 20 and, in this moment, the "Reverse drive" gear set GR rotates in a reversed direction to enable power transfer in the "Reverse Drive" gear range.

Also, during a start in the "Reverse Drive" gear range, of course, it follows that the engagement and motion of the clutch C1 is controlled to meet the intended start in the reverse drive.

By the way, the twin-clutch manual transmission, of the embodiment with such a structure set forth above, is configured in a structure described below.

The meshing mechanism 29 is disposed in the concentric abutment section between the rear end 5a of the first input shaft 5 and the output shaft 11 to suitably provide direct coupling between the input shaft 5 and the output shaft 11 to accommodate the direct-coupling gear range for the "Fifth-speed range".

The gear range group disposed between the rear end 5a of the first input shaft 5 and the counter shaft 15 takes the form of the same odd-numbered gear range group as the gear range group to which the direct-coupling gear range ("Fifth-speed range") belongs.

This results in a twin-clutch manual transmission, useful for an FR-vehicle, which maintains a characteristic of the twin-clutch manual transmission to be available to provide automatic power transmission even though it is the manual transmission, while the provision of the direct-coupling gear range ("Fifth-speed range") minimizes the number of reduction gear ratios, to thereby enable a closed-gear-ratio configuration between the "Fifth-speed range" and the "First-speed range".

Also, in cases where there are a large number of gear ranges for the higher speed than the "Fifth-speed range", the provision of the direct-coupling gear range ("Fifth-speed range") enables the minimization of the number of gear ratios in a high speed gearshift region to provide a closed-gear-ratio configuration between the "Fifth-speed range" and the maximum speed gear range.

By the way, with the above-described embodiment, the direct-coupling gear range is determined to take the form of the gear range for the "Fifth-speed range" and the gear range group is configured to include the odd-numbered gear range group that is disposed between the rear end 5a of the first input shaft 5 and the counter shaft 15.

In cases where the direct-coupling gear range is determined to include an even-numbered gear range, it is needless to say that a gear range group disposed between the rear end 5a of the first input shaft 5 and the counter shaft 15 is configured to include an even-numbered gear range group for thereby making it possible to achieve automatic power transmission with the twin-clutch manual transmission.

Further, with the above-described embodiment, among the gear sets G1, GR, G3 of the gear range group disposed between the rear end 5a of the first input shaft 5 and the counter shaft 15, the gear set G3 for the "Third-speed range", closest in a synchronization meshing capacity to the direct-coupling gear range (the "Fifth-speed range"), is located on the first input shaft 5 on the rearmost end thereof.

The single synchronizer 29 serves both as a meshing mechanism available to connect the gear set G3 and a meshing mechanism available to connect the direct-coupling gear range for the "Fifth-speed range".

This enables a single piece of a synchronizer to be sufficed to serve both for the "Third-speed range" and the "Fifth-speed range" to realize a simplified structure at a low cost, while enabling the minimization of the twin-clutch manual transmission in an axial dimension thereof.

Additionally, since the synchronization meshing capacities, required for the "Third-speed range" and the "Fifth-speed range", are close to one another, the synchronizer 29, serving both for the "Third-speed range" and the "Fifth-speed range", can be easily designed.

Further, with the embodiment set forth above, the odd-numbered gear range group disposed between the rear end portion 5a of the first input shaft 5 and the counter shaft 15 incorporate the "Reverse drive" gear range to allow the "Reverse drive" gear range to assume a position between the rear end portion 5a of the first input shaft 5 and the counter shaft 15, obtaining advantageous effects as described below.

That is, due to a need for the provision of the "Reverse Idler" gear 25 in the "Reverse drive" gear range GR, the "Reverse drive" gear range GR needs to have three gears that tend to be largely sized in a radial direction. Thus, with a structure in which the "Reverse drive" gear range GR is disposed between the second input shaft 6 and the counter shaft 15, there is a tendency in which due to a large size of the second input shaft 6 for the purposes of incorporating therein the first input shaft 5, the twin-clutch manual transmission is largely sized in a radial direction.

However, like in the embodiment, in cases where the "Reverse drive" gear range is disposed between the rear end portion 5a of the first input shaft 5 and the counter shaft 15, the first input shaft 5 has a smaller diameter than that of the second input shaft 6, enabling reduction of the above tendency in which the twin-clutch manual transmission is largely sized in the radial direction.

In addition, with the embodiment, the rear end portion 5a of the first input shaft 5 and the counter shaft 15 are rotatably supported by the stationary intermediate wall 1b of the transmission case 1 in a position between the gear set G3 of the gear range (the "Third-speed range"), positioned in the rearmost area of the first input shaft 5, and the gear sets G1, GR of the respective gear ranges (the "First-speed range", the "Reverse drive") located in a position further forward area than the gear set G3.

This results in a capability for middle sections of the rear end portion 5a of the first input shaft 5 and the counter shaft 15 to be rotatably supported by a bearing section such that the gear sets are located on both sides of the bearing section, resulting in an increase in supporting rigidities of the rear end portion 5a of the first input shaft 5 and the counter shaft 15.

Furthermore, with the embodiment, the gear set GR of the "Reverse drive" gear range is located in a position close proximity to the bearing section (in an area provided with the bearings 10, 17) by which the rear end portion 5a of the first input shaft 5 and the counter shaft 15 are rotatably supported. It is thus possible for the "Reverse drive" gear range GR, which has a large gear ratio to transfer a large torque, to have an increased mounting strength as required.

Moreover, with the embodiment, of the gear sets G1, G3 of the gear range group disposed between the rear end portion 5a of the first input shaft 5 and the counter shaft 15, the gear set G1 of the lowest speed gear range is placed adjacent to the gear set GR of the "Reverse drive" gear range.

The input and output gears 21, 22, forming the gear set G1 of the lowest speed gear range, have pitch circle diameters similar to those of the input and output gears 23, 24 that form the "Reverse drive" gear range.

This enables the reduction in fears of interference among the input and output gears 21, 22, 23, 24 during assembling work to mount the "Reverse Idler" shaft 25a onto the transmission case 1 for rotating capabilities to support the "Reverse Idler" gear 25 forming the "Reverse Drive" gear range GR, making it possible to minimize restrictions on design choices.

Besides, with the embodiment, the "Reverse Idler" gear 25, forming the "Reverse Drive" gear range GR, is rotatably supported by the transmission case 1 by means of the "Reverse Idler" shaft 25a that is interposed between the flange 25b, disposed between the gear set G1 of the lowest speed gear range and the gear set GR of the "Reverse drive" gear range and fixedly secured to the transmission case 1, and the intermediate wall 1b of the transmission case 1.

This enables the "Reverse Idler" shaft 25a to have increased supporting strength to allow the "Reverse Drive" gear range GR, through which a large torque is transferred, to reliably provide increased supporting strength.

Also, due to a layout wherein the flange 25b is placed in a wasteful space between the gear set G1 of the lowest speed gear range and the gear set GR of the "Reverse drive" gear range, no separate space needs to be provided for the flange 25b and such a configuration is remarkably advantageous in view of increased space efficiency.

Finally, with the embodiment, a single synchronizer 28 serves both as a meshing mechanism for suitably coupling the gear set G1 of the lowest speed gear range and a meshing mechanism for suitably coupling the gear set GR of the "Reverse drive" gear range, and the meshing mechanism 28 is located on the counter shaft 15 in a position between the lowest speed gear range and the gear set GR of the "Reverse drive" gear range.

This results in a capability for the synchronizer 28, common to both the gear sets G1, GR, to be placed in a large space defined between the output gears 22, 24, each with a large diameter, which constitute the gear sets G1, GR, providing an ease of placement of such a meshing mechanism while making it easy to ensure an increased synchronization meshing capacity.

The twin-clutch manual transmission, with the embodiment set forth above, has additional merits as described below. That is, the rotational power, resulting from gearshift operations through the gear sets G1, GR, G3 of the gear range group, disposed between the rear end portion 5a of the first input shaft 5 and the counter shaft 15, and the gear sets G2, G4, G6 of the gear range group disposed between the second input shaft 6 and the counter shaft 15, can be extracted from the output shaft 11 via the counter shaft 15 and the reduction gear set 19, 20.

This results in a structure wherein the gear sets G1, GR, G3, G2, G4, G6 for speed range selection are placed in an area upstream of the reduction gear set 19, 20 on a torque transmission flow path and no rotational power with a large torque resulting from speed reduction with the reduction gear set 19, 20 passes through the gear sets G1, GR, G3, G2, G4, G6.

Therefore, no need arises for all of the gear sets G1, GR, G3, G2, G4, G6 for speed range selection to have face widths to withstand a large torque. Thus, it is sufficed for only the reduction gear set 19, 20 to have specifications to withstand such a large torque set forth above, thereby addressing issues of an increase in an axial dimension of the power transmission and issues of economic disadvantage in costs.

Further, with the twin-clutch manual transmission in the embodiment, the gear range group disposed between the rear end portion 5a of the first input shaft 5 and the counter shaft 15 is the odd-numbered gear range group for the "First-speed range", the "Reverse drive" and the "Third-speed range", and the gear range group disposed between the second input shaft 6 and the counter shaft 15 is the even-numbered gear range group for the "Second-speed range", the "Sixth-speed range", and the "Fourth-speed range", thereby obtaining additional merits as described below.

Among the gears forming the gear sets G1, GR, G3, G2, G4, G6 of the respective gear ranges, the lower the speed for the input gears 21, 23, 26, 32, 34, 30 disposed on the input shafts 5, 6, the lower will be the pitch circle diameter and, among the input gears 21, 23, 26, 32, 34, 30, the input gear 21 for the "First-speed range" has the smallest pitch circle diameter.

If the gear range group disposed between the second input shaft 6 and the counter shaft 15 is arranged to include the odd-numbered gear ranges, there is a need for the "First-speed range" input gear 21 with the smallest pitch circle diameter to be disposed on an outer periphery of the second input shaft 6, which is hollow and has a large diameter, and it becomes hard to place the "First-speed range" input gear 21.

However, if the second input shaft 6 is made small in outer diameter to enable the provision of the "First-speed range" input gear 21, there is an issue with reduction in strength of the second input shaft 6. In addition, the elongated first input shaft 5, disposed inside the second input shaft 6, has no choice but to has a small diameter, resulting in reduction in strength.

However, in the embodiment, due to a structure wherein the gear range group disposed between the rear end portion 5a of the first input shaft 5 and the counter shaft 15 include the odd-numbered gear ranges (the "First-speed range", the "Reverse drive" and the "Third-speed range"), and the gear range group disposed between the second input shaft 6 and the counter shaft 15 include the even-numbered gear ranges (the "Second-speed range", the "Fourth-speed range", and the "Sixth-speed range"), an additional advantage is obtained as described below.

The input gears 32, 34, 30 associated with the gear ranges beyond the "Second-speed range" are located on the outer periphery of the second input shaft 6 and, even with the "Second-speed range" input gear 32 with the smallest pitch circle diameter among those gears, the "Second-speed range" input gear 32 can be located on the second input shaft 6 without decreasing the diameter of the second input shaft 6, avoiding issues of a decrease in strengths of the second input shaft 6 and the first input shaft 5.

Furthermore, the twin-clutch manual transmission has a layout wherein the counter shaft 15 carries all of the meshing mechanisms 37, 38 operative to suitably engage the gear sets G2, G4, G6 of the even-numbered gear range group mounted between the second input shaft 6 and the counter shaft 15.

This results in no need to mount the synchronizers 37, 38 on the second input shaft 6 that has a tendency with reduction in wall thickness because of the presence of limitations in a radial space and it is remarkably advantageous to have a capability of avoiding a drop in rigidity of the second input shaft 6.

The twin-clutch manual transmission of the embodiment set forth above has further additional advantageous effects as explained below.

In the embodiment, the gear sets G2, G4, G6 of the even-numbered gear range group for "Second-speed range", "Fourth-speed range" and "Sixth-speed range" located between the second input shaft 6 and the counter shaft 15 are assembled in a manner described below.

That is, among the gears 30, 32, 34 mounted on the second input shaft 6, the gear set G4 of the lowest speed "Fourth-speed range" stage, forming one of the gear ranges for "Fourth-speed range" and "Sixth-speed range" associated with the gear sets 30, 34 whose diameters are available to provide a bearing accommodation space for the needle bearing 8 between the first input shaft 5 and the second input shaft 6, is mounted on the second input shaft 6 at an area remotest from the engine.

This enables the accommodation space for receiving the needle bearing 8 to be enhanced between the rear end of the second input shaft 6 and the first input shaft 5 without a need to form an annular recess in the first input shaft 5 for receiving the needle bearing 8. Thus, it becomes possible to accommodate the needle bearing 8 between the rear end of the second input shaft 6 and the first input shaft 5 without causing a drop in strength of the first input shaft 5.

Accordingly, the embodiment makes it possible to increase a bearing span between the needle bearings 7, 8 disposed between both the input shafts 5, 6, resulting in an increase in bearing rigidity between both the input shafts 5, 6.

With the embodiment, further, the gear sets G2, G4, G6 of the even-numbered gear range group for "Second-speed range", "Fourth-speed range" and "Sixth-speed range" and disposed between the second input shaft 6 and the counter shaft 15 and, of the gear range group for "Second-speed range" and "Sixth-speed range" other than the above-described "Fourth-speed range" gear range, the gear set G6 of the highest speed ("Sixth-speed range") gear range is assembled in a position closest to the engine.

This allows the gear 31, mounted on the counter shaft 15, forming part of the gear set G6, to have a small diameter because of the highest speed ratio, thereby enabling reduction in diameter of a front end of the counter shaft 15 in an area closer to the engine.

Another advantage resides in that the counter shaft 15 is formed to have a profile that progressively decreases in diameter from the middle portion toward the front end, enabling both factors required on the ground of assembling and the other factors required on the ground of strength to be satisfied.

Further, in cases wherein there are more gear range groups between the second input shaft 6 and the counter shaft 15 than those three groups, shown in FIGS. 1 and 2, and there are a plurality of gear ranges between one gear set, remotest from the engine, and the other gear set, closest to the engine, gear sets of these plural gear ranges are disposed such that the higher in speed of the gear set, the closer will be the engine for a position of such a gear set. This makes it possible to satisfy the above-described requirement in which the counter shaft 15 is narrowed from the middle portion toward the front end.

Furthermore, in cases where the gear shift groups located between the second input shaft 6 and the counter shaft 15 contain the even-numbered gear ranges, as shown by the example in FIGS. 1 and 2, it has been confirmed that the "Fourth-speed range" satisfies the above-described requirement in relation to a speed ratio suitable in practical use regardless of the number of relevant even-numbered gear ranges and it is practical to locate the "Fourth-speed range" gear set G4 in a position remotest from the engine.

With the embodiment, in addition, among the gear sets G2, G4, G6 of the gear range group for "Second-speed range", "Fourth-speed range" and "Sixth-speed range" provided between the second input shaft 6 and the counter shaft 15, the gear set G6, placed in the position closest to the engine, and the gear set G2 disposed in the vicinity of the gear set G6 enable the provision of the meshing mechanism 37 to suitably engage the gear set G6 placed in the position closest to the engine.

Therefore, no structural components, for synchronization meshing, involving a clutch gear, like the clutch gear 37b, are present between the meshing mechanism 37 and the gear set G2 (gear 33) and, to that extent, the gear set G2 (gear 33) can be arranged to be closer to the bearing section (roller bearing) 16 mounted on the front wall 1a of the transmission case 1 for rotatably supporting the counter shaft 15. This provides an increase in supporting rigidity of the counter shaft 15 for the gear set G2 (gear 33), by which increased torque is transferred because of the presence of the maximum gear ratio, to adequately withstand the relevant increased torque.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2004-082310, filed on Mar. 22, 2004, the disclosure of which is expressly incorporated herein by reference in its entirety.

What is claimed is:

1. A twin-clutch manual transmission comprising:
  first and second input shafts adapted to selectively receive an engine rotational power through respective clutches, the second input shaft being hollow and rotatably supported on the first input shaft such that the first input shaft protrudes from a rear end of the second input shaft to a position remote from an engine to form a rear end portion;
  a counter shaft extending parallel to the first and second input shafts;
  gear sets of one of an odd-numbered gear range group and an even-numbered gear range group disposed between the rear end portion of the first input shaft and the counter shaft to provide power transfer;
  gear sets of the other of the odd-numbered gear range group and the even-numbered gear range group disposed between the second input shaft and the counter shaft to provide power transfer;
  an output shaft placed in a concentric and abutting relationship with a rear end of the first input shaft to allow a rotational power, resulting from speed reduction depending on a selected gear range, to be extracted from the output shaft through the counter shaft; and a meshing mechanism disposed on an a butting section between the rear end of the first input shaft and the output shaft, the meshing mechanism operative to provide a direct-coupling gear range in which the first input shaft and the output shaft are directly coupled;

wherein the gear range group disposed between the rear end portion of the first input shaft and the counter shaft includes the same gear range group as the odd-numbered gear range group or the even-numbered gear range group to which the direct-coupling gear range belongs, and wherein the rear end portion of the first input shaft and the counter shaft are rotatably supported on a stationary wall of a transmission case at a rotation support section thereof between one gear set disposed on the rearmost area of the rear end portion of the first input shaft and another gear set located on the first input shaft and forward of and adjacent to the one gear set.

2. The twin-clutch manual transmission according to claim 1, wherein:

among the gear sets of the gear range group disposed between the rear end portion of the first input shaft and the counter shaft, a gear set of a gear range, whose synchronization meshing capacity is closest to that of the direct-coupling gear range, is located at the rearmost area of the first input shaft; and wherein the meshing mechanism for the direct-coupling gear range serves as a meshing mechanism operative to have the gear set of the gear range whose synchronization meshing capacity is closest to that of the direct-coupling gear range to provide power transfer.

3. The twin-clutch manual transmission according to claim 1, wherein:

the direct-coupling gear range serves for a "Fifth-speed range", while the gear range disposed at the rearmost area of the first input shaft serves for a "Third-speed range".

4. The twin-clutch manual transmission according to claim 1, wherein:

the gear range group, gear sets of which are disposed between the rear end portion of the first input shaft and the counter shaft includes "Reverse drive" gear range.

5. The twin-clutch manual transmission according to claim 1, wherein:

a gear set for "Reverse drive" gear range is disposed in close proximity to the rotation support section.

6. The twin-clutch manual transmission according to claim 5, wherein:

among the gear sets of the gear range group disposed between the rear end portion of the first input shaft and the counter shaft, a gear set of the lowest speed gear range is disposed adjacent to the gear set for the "Reverse drive" gear range.

7. The twin-clutch manual transmission according to claim 6, wherein:

a "Reverse Idler" gear forming the gear set of the "Reverse Drive" gear range is rotatably supported on the transmission case via a "Reverse Idler" shaft extending between a flange of the transmission case formed between the gear set of the lowest speed gear range and the gear set of the "Reverse drive" gear range, and the stationary wall of the transmission case.

8. The twin-clutch manual transmission according to claim 6, wherein:

a meshing mechanism operative to allow the gear set of the lowest speed gear range to provide power transfer, serves as a meshing mechanism for allowing the gear set of the "Reverse drive" gear range to provide power transfer; and wherein the meshing mechanism is disposed on the counter shaft at a position between the gear set of the lowest speed gear range and the gear set of the "Reverse drive" gear range.

\* \* \* \* \*